United States Patent
Das et al.

(10) Patent No.: US 9,765,992 B2
(45) Date of Patent: Sep. 19, 2017

(54) SOLAR RECEIVER

(71) Applicant: ALSTOM Technology Ltd., Baden (CH)

(72) Inventors: Apurba Das, Broad Brook, CT (US); David McGrane, Chicopee, MA (US); Marco Simiano, Zürich (CH); Erik Boschek, Zürich (CH); Xiao-Peng Gan, Rugby (GB)

(73) Assignee: General Electric Technology GmbH, Baden (CH)

( * ) Notice: Subject to any disclaimer, the term of this patent is extended or adjusted under 35 U.S.C. 154(b) by 622 days.

(21) Appl. No.: 14/139,904

(22) Filed: Dec. 24, 2013

(65) Prior Publication Data
US 2015/0176863 A1    Jun. 25, 2015

(51) Int. Cl.
*F24J 2/46* (2006.01)
*F24J 2/07* (2006.01)

(52) U.S. Cl.
CPC ............ *F24J 2/4647* (2013.01); *F24J 2/07* (2013.01); *F24J 2002/4601* (2013.01); *Y02E 10/41* (2013.01)

(58) Field of Classification Search
CPC ....... F24D 2200/14; Y02P 80/24; F22B 1/006
See application file for complete search history.

(56) References Cited

U.S. PATENT DOCUMENTS

| 4,067,317 A | 1/1978 | Hubbard | |
|---|---|---|---|
| 4,407,269 A | 10/1983 | Hopper | |
| 4,474,169 A | 10/1984 | Steutermann | |
| 2011/0209697 A1* | 9/2011 | Plotkin | F24J 2/07 126/663 |
| 2013/0118481 A1* | 5/2013 | Wasyluk | F24J 2/24 126/663 |
| 2013/0192586 A1* | 8/2013 | Wasyluk | F22B 1/006 126/619 |

FOREIGN PATENT DOCUMENTS

| EP | 1 873 397 | 1/2008 |
|---|---|---|
| EP | 2000669 A2 | 12/2008 |
| ES | 2394353 A1 | 1/2013 |
| WO | 2005/078360 A1 | 8/2005 |
| WO | 2011/044281 A2 | 4/2011 |
| WO | 20111154537 A1 | 12/2011 |
| WO | 20131006630 A2 | 1/2013 |

OTHER PUBLICATIONS

Kolb, "An Evaluation of Possible Next-Generation High-Temperature Molten-Salt Power Towers", Sandia National Laboratories, SAND2011-9320, Dec. 2011.

* cited by examiner

*Primary Examiner* — David J Laux
(74) *Attorney, Agent, or Firm* — Dority & Manning, P.A.

(57) ABSTRACT

A solar receiver, designed to use a heat transfer medium, includes a plurality of panels. Each panel is arranged and configured to enable the heat transfer medium to flow in at least one flow direction, one flow direction defining a pass, to obtain unique mass flux in each pass to optimize the heat flux capability of the pass while minimizing pressure drop across the selected passes of the heat transfer surface. A method thereof is also provided.

6 Claims, 4 Drawing Sheets

SOLAR RECEIVER

TECHNICAL FIELD

The present disclosure relates to solar thermal power plants, and more particularly, to a solar receiver in such solar plants.

BACKGROUND

A solar thermal power plant includes a large field of heliostats and a solar receiver placed on a tower of substantial height. The heliostats focus direct sunlight on to the solar receiver to produce steam. The steam is utilized to run a turbine and extract work in order to produce electricity. Typically, the solar thermal power plant operates on a daily cycle, during clear sunlight hours, while shutting down in nights or in overcast conditions. However, if the solar thermal power plant is to meet the electricity demand during night and overcast conditions, it needs to be operable irrespective of the availability of solar light, i.e. in nights or in overcast conditions. Most importantly, it improves the dispatchability and hence reduces the levelized cost of electricity. A realization of such a solar thermal power plant generates a requirement of storing solar thermal energy during day times and utilizing thereto in nights or in overcast conditions. For such requirement, a central receiver can be designed to use the medium for thermal storage as the heat transfer medium, such as molten salt or thermal oil/thermic fluid etc. Such arrangement may be evident, for example, in European Patent bearing number 1 873 397 A2 and many others.

A typical receiver system 10, as known in various prior arts, may be evident in FIG. 1. The system 10 includes a receiver 12, hot and cold storage tanks 14, 16, respectively, and a Rankine cycle power block 18 to generate electricity. The molten salt fluid at the receiver 12 is being heated through focusing the sunlight via heliostats 20. The hot salt is stored in the hot storage tank 14, at temperature of about 565° C., and after thermal energy thereof is being utilized by the cycle 18 for producing electricity through generator 'G', it is stored in the cold storage tank 16, at temperature of about 290° C., from where it is further sent to the receiver 12 to be reheated.

In such system 10, the design of receiver 12 is very critical for efficiently operation of the system 10.

SUMMARY

The present disclosure describes a solar receiver with improved design that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a solar receiver with improved design that may optimize efficiently working of solar operated power plants. Various other objects and features of the present disclosure will be apparent from the following detailed description and claims.

The above noted and other objects, in one aspect, may be achieved by means of a solar receiver having a heat transfer medium disclosed in the present disclosure. The solar receiver includes a plurality of panels defining a heat transfer surface. Each panel is arranged and configured to enable the heat transfer medium to flow in at least one flow direction, one flow direction defining a pass, to obtain various mass flux in various passes to optimize heat flux capability of the pass based on the location of the pass in the heat transfer surface, in order to minimize a Lost Heat Flux Design Space (LHFDS) of the heat transfer surface, thereby improving the efficiency of the solar receiver. The term "LHFDS" is defined as an unutilized design space of the heat transfer surface and is a difference between a Maximum Allowable Heat Flux (MAHF) and Actual Heat Flux (AHF) of the heat transfer surface.

In one embodiment of the present disclosure, each panel includes a plurality of tubes comprised of predetermined variable parameters to obtain various mass fluxes across various defined passes. The predetermined variable parameters may be at least dimensional parameters and material composition parameters of the tubes. The dimensional parameters may be at least diameters of tubes, thickness of the tubes and number of the tubes.

In one embodiment of the present disclosure, the material composition of the tubes alone may be used to affect the MAHF irrespective of other dimensional variable thereof and without altering mass flux. Specifically, as per this embodiment, the solar receiver a plurality of panels defining a heat transfer surface, each panel having a plurality of tubes arranged and configured to enable the heat transfer medium to flow in at least one flow direction, one flow direction defining a pass, to optimize heat flux capability of the various passes based on the location of the pass in the heat transfer surface, in order to minimize a Lost Heat Flux Design Space (LHFDS) of the heat transfer surface, wherein the tubes of the various passes of the solar receiver is comprised of various material composition.

In another aspect, a method for improving efficiency of a solar receiver having a heat transfer medium is provided. The method includes tailoring the mass flux of the heat transfer medium to flow in at least one flow direction in each panel of a plurality of panels of the solar receiver, one flow direction defining a pass, to obtain different mass flux in various passes to minimize the LHFDS.

The term "Maximum Allowable Heat Flux (MAHF)" used herein is defined as the maximum heat flux that may be applied without damaging the solar receiver panels and the tubes or any integral part thereof under the conditions of pressure, temperature, mass flow, etc. inside the tubes.

The term "Actual Heat Flux (AHF)" used herein is defined as the actual heat flux utilized and is shown as bounded space only of the passes in FIG. 4A.

The term "Heat Flux Design Space (HFDS)" used herein is defined as the bounded space for design of the receiver tubes, which is graphically represented in FIG. 4A as the area under curve $i_1$, which is a plot of MAHF versus heat transfer fluid temperature, and will be explained herein further.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of another embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the terms "a" and "an" herein do not denote a limitation of quantity, but rather denote the presence of at least one of the referenced item.

Figure 1:
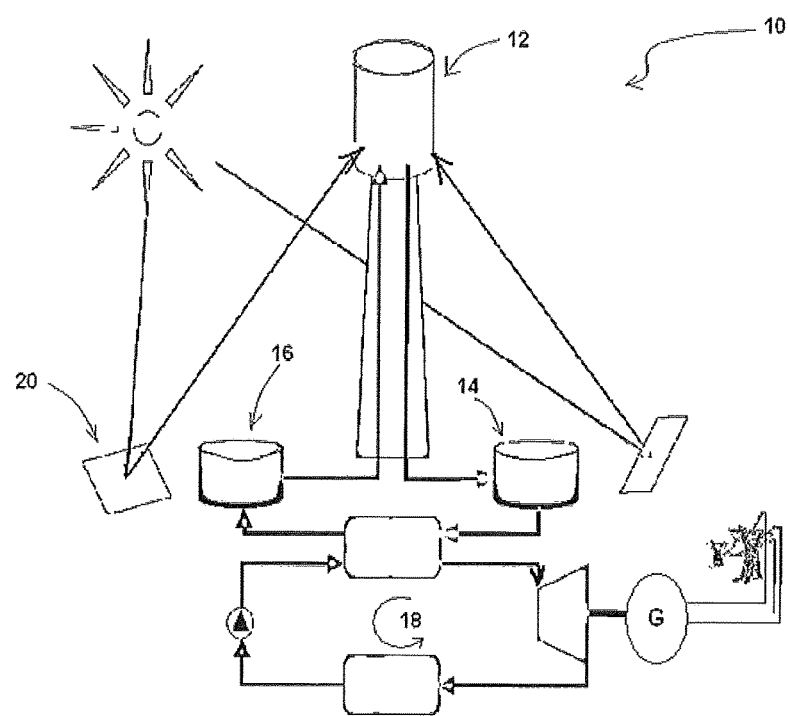
FIG. 1 illustrates a typical example of a tower type solar power plant, in accordance with an exemplary embodiment of the present disclosure.
Figure 2:
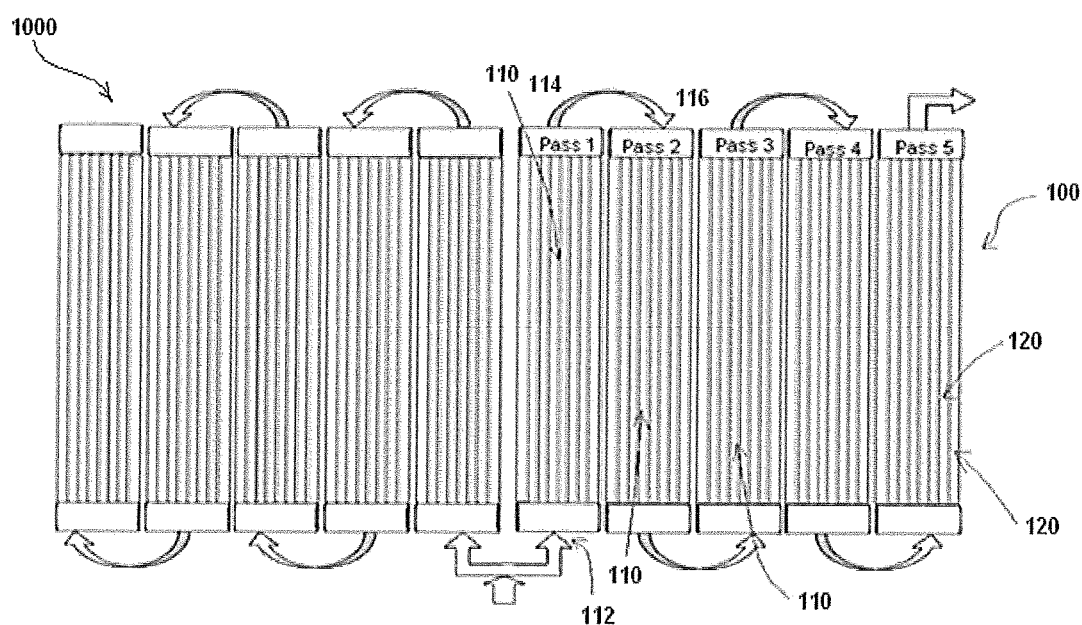
FIG. 2 illustrates an example of a plurality of panels defining a heat transfer surface in a solar receiver, in accordance with an exemplary embodiment of the present disclosure.

Referring now to FIG. 2, an example line diagram of panels 1000 that defines a heat transfer surface 100 of a solar receiver. In particular, FIG. 2 depicts heat transfer surface 100 with two branches of panels 1000. The solar receiver having the heat transfer surface 100 is configured to circulate heat transfer medium therethrough to transfer the heat applied therein to be stored, as explained with respect to FIG. 1, which is illustrating general art in the field. In as much as the construction and arrangement of the heat transfer surface 100 for the solar receiver in a solar operated power plant having the tower structure, and the heliostat field are all well-known to those skilled in the art, it is not deemed necessary for purposes of acquiring an understanding of the present disclosure that there be recited herein all of the constructional details and explanation thereof. Rather, it is deemed sufficient to simply note that as shown in FIG. 2, the line diagram depicting the heat transfer surface 100 and various associated components thereof as shown in FIG. 1 may be successfully utilized in relation to any solar operated power plants 10. Further, it should be understood that the heat transfer surface 100 in combination with solar receiver may include a variety of components for performing their assigned purpose, and only those components are shown that are relevant for the description of various embodiments of the present disclosure.

The heat transfer surface 100 is arranged and configured to enable the heat transfer medium to flow in at least one flow direction, wherein one flow direction is defined as a pass 110. For example, as shown in FIG. 2, heat transfer medium enters the heat transfer surface 100 at 112 and flows in upward direction is considered to be one pass 110, i.e. 'Pass 1'. The heat transfer medium then exits at 114 and enters at 116 to flow in downward direction is considered to be second pass 110, i.e. 'Pass 2' and so on, like 'Pass 3,' 'Pass 4,' 'Pass 5'. In one embodiment of the present disclosure, there may be one flow direction, i.e. one pass 110, through heat transfer surface 100, whereas in another embodiment of the present disclosure, there may be multiple passes 110, through the heat transfer surface 100. The heat transfer surface 100 is configured and arranged in such a manner that it is capable of obtaining various mass fluxes in individual or various passes 110 to optimize heat flux capability of the pass 110 based on the location of the pass in the heat transfer surface 100, in order to minimize a Lost Heat Flux Design Space (LHFDS) of the heat transfer surface 100, thereby improving the efficiency of the solar receiver. The LHFDS is specifically defined as an unutilized design space of the heat transfer surface 100 and is a difference between Maximum Allowable Heat Flux (MAHF) and Actual Heat Flux (AHF) of the heat transfer surface, and will be explained herein with respect to FIGS. 4A and 4B.

In one preferred embodiment of the present disclosure to obtain various mass fluxes across the passes 110, each panel 1000 includes a plurality of tubes 120 adapted to be stacked or grouped to define the pass 110. The tubes 120 are comprised of predetermined variable parameters to obtain various or unique mass flux across each of the defined pass 110 through the heat transfer surface 100. Such predetermined variable parameters may be at least dimensional parameters and material composition parameters of the tubes 120. The dimensional parameters may be at least diameters of tubes, thickness of the tubes and number of the tubes. For obtaining various mass flux across any selective pass 110 of the heat transfer surface 100, the tubes 120 of the pass 110 may be constructed with a predetermined material composition and predetermined tube diameter, predetermined thickness and predetermined number of tubes in pass 110 in combination or individually.

The construction of each pass 110 is tailored with the predetermined material and dimensional tubes parameters, in order to tailor the mass flux of the heat transfer medium through each pass 110. The tailoring of the each pass 110 located at a specific section of the heat transfer surface 100 is done to provide optimal heat flux capability for the pass 110 consistent with the solar field 20 capability to provide heat flux to that section of the heat transfer surface 100. The pass 110 design involves important consideration to the system pressure drop as well as thermal losses from the receiver surface 100.

Figure 3A:
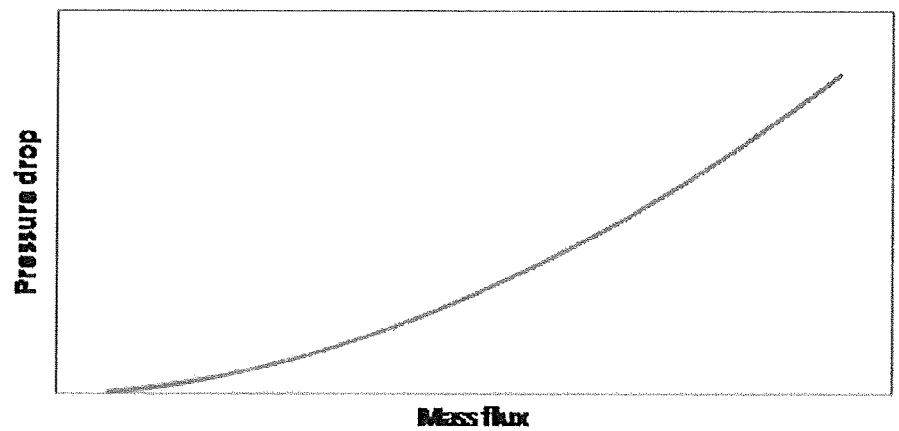
FIGS. 3A and 3B illustrate graph plots depicting various advantages of the present invention, in accordance with an exemplary embodiment of the present disclosure.
Figure 3B:
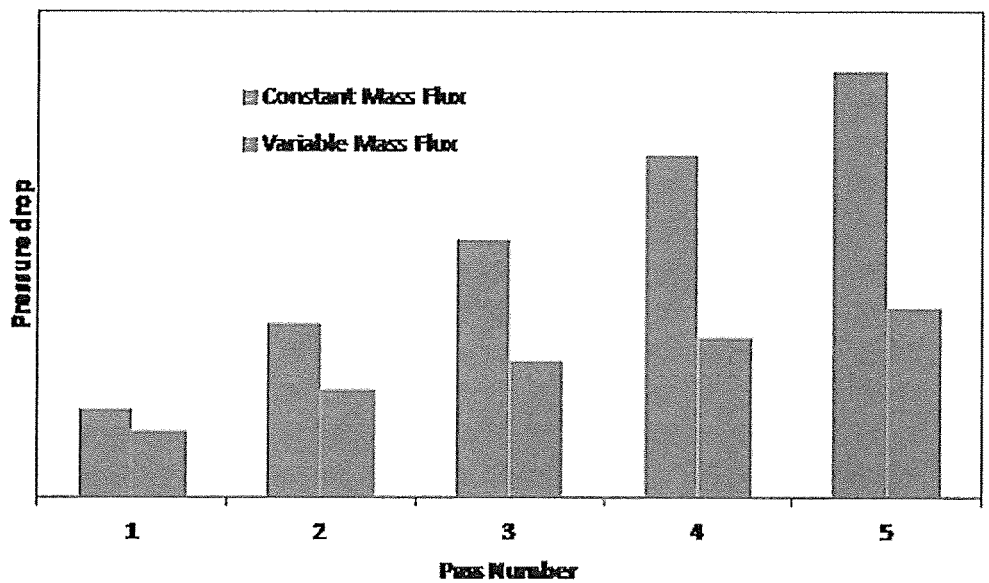

FIGS. 3A and 3B, illustrate effect of various mass fluxes on pressure drop. FIG. 3A illustrates effect of the varying mass flux on the pressure drop for a given length of total tube 120 length including all the passes 110 constituting the heat transfer surface 100. FIG. 3B illustrates cumulative pressure drop after each pass for an arbitrary example with various mass and constant mass flux across the heat transfer surface 100.

Figure 4A:
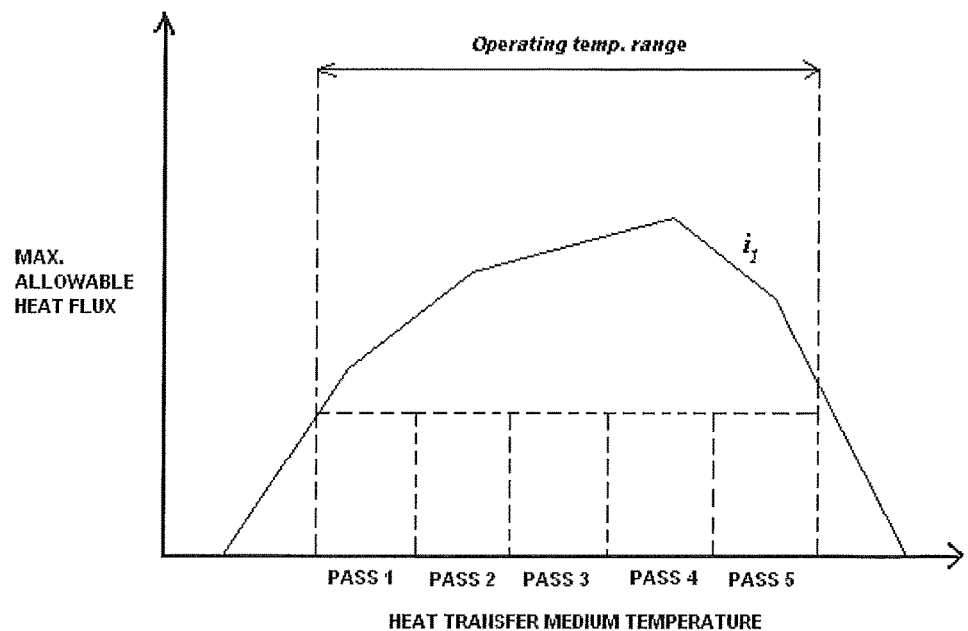
FIGS. 4A and 4B illustrate the heat flux design space of the receiver with constant mass flux and various mass flux across the receiver respectively.
Figure 4B:
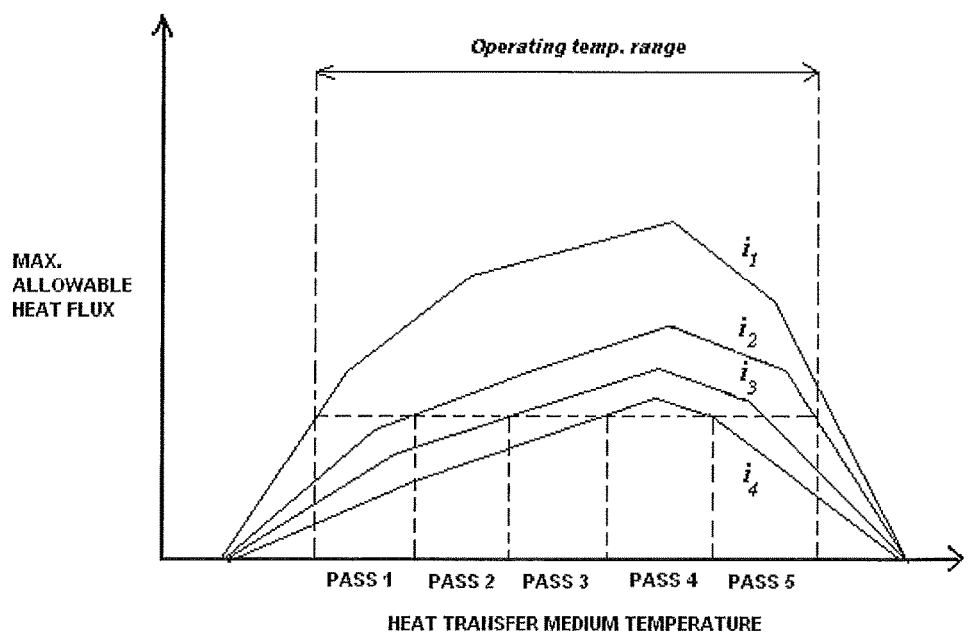

Referring now to FIGS. 4A and 4B (explained in conjunction with FIG. 2), which respectively, illustrate example Heat Flux Design Space (HFDS) of the receiver with constant mass flux and various mass fluxes across the receiver in order to understand a Lost Heat Flux Design Space (LHFDS) of the heat transfer surface 110. FIG. 4A, for example, illustrates one such arbitrary plot defining the HFDS bounded by the horizontal axis and the MAHF plot ($i_1$) corresponding to the mass flux and other composition and geometry parameters of the tube 120. The temperature of the heat transfer medium is raised in steps while it is transported through several passes 110 of the receiver. FIG. 4A shows the rise in temperature of the heat transfer medium as it transports through (arbitrarily chosen) five passes 110, as shown in FIG. 2. In the example illustration, for simplicity, equal heat flux (shown by horizontal broken line) is applied all around the receiver and the composition parameter of the tubes for all the passes are kept the same. However, the discussion remains unchanged, even when the applied heat flux changes around the receiver and the composition parameter of the tubes 120 for different passes 110 are changed. The current state of the art design, involves all the passes 110 of the receiver with same composition and geometry parameters, as present in a paper by Gregory J. Kolb, titled '*An Evaluation of Possible Next-Generation High-Temperature Molten-Salt Power Towers*,' published in December 2011. Therefore, the mass flux and hence the heat flux design space remains equal for all the passes 110 of the receiver. It is to be noted that for such case, in order to accept the heat flux without damaging the tube 120 throughout the range of the operating temperature, a large portion of the HFDS remains unutilized. This is defined by the space between the MAHF plot and the horizontal broken line in FIG. 4A. This unutilized design space is termed as lost heat flux design space (LHFDS). As noted above, this disclosure proposes using different mass fluxes in different passes 110 of the receiver or in other words each pass configures to include unique MAHF, such as $i_1$, $i_2$, $i_3$, . . . $i_n$, depending upon number of passes, such as pass 1, pass 2, pass 3 . . . pass n.

FIG. 4B for example demonstrates utilization of different mass fluxes in different passes. In FIG. 4B, a family of MAHF plots $i_1$, $i_2$, $i_3$, and $i_4$ are shown corresponding to mass flux, where mass flux in respective MAHF plots $i_1$, $i_2$, $i_3$, and $i_4$ changes such that MAHF $i_1$, $i_2$, $i_3$, and $i_4$ are descending as $i_1 > i_2 > i_3 > i_4$. The mass flux for each pass is optimized, so that a LHFDS may be a minimum. The LHFDS in FIG. 4B may be determined by the area included within the horizontal broken line, i.e. Actual Heat Flux (AHF), and the MAHF plot within the temperature rise range for each pass 110. As a general rule, by changing the mass flux through different passes 110, the heat flux design space is optimized and the pressure drop across the receiver is minimized.

Similarly, the material composition of the tubes 120 alone, i.e. without altering mass flux, may also affect the MAHF irrespective of other dimensional variable thereof. As curve $i_1$ and $i_2$ (and so on) differs based on mass flux alone, similarly, $i_1$ and $i_2$ (and so on) may be different due to material selection of the tube 120 alone or in combination.

The receiver of the present disclosure is advantageous in various scopes. The receiver design with optimized LHFDS by means of tailored mass flux, has lower pressure drop across the heat transfer surface 100 than may otherwise have occurred due to constant mass flux. Mass flux optimization has benefits in terms of pressure drop which translates to auxiliary power consumption and plant operating cost savings. The receiver design with optimized LHFDS by means of material composition optimization has benefits in terms of initial capital investment when the heat transfer surface is optimally designed, eliminating LHFDS. When both aspects of receiver optimization are considered, this reduces the overall capital investment and operating cost of the power plant, increasing the efficiency thereof and reducing cost of electricity. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above examples. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A solar receiver, having a heat transfer medium, for a solar power system, the solar receiver comprising:
   a plurality of panels defining a heat transfer surface, each panel arranged and configured to enable the heat transfer medium to flow in at least one flow direction, the at least one flow direction defining a pass to obtain various mass fluxes in various passes to optimize heat flux capability of the pass based on the location of the pass in the heat transfer surface in order to minimize a Lost Heat Flux Design Space (LHFDS) of the heat transfer surface, thereby improving the efficiency of the solar receiver,
   wherein each panel is comprised of a plurality of tubes, the plurality of tubes in a first panel comprising a different material, tube thickness, or number of tubes than the plurality of tubes in a second panel to give the first panel a different mass flux than the second panel.

2. The solar receiver as claimed in claim 1, wherein the LHFDS is an unutilized design space of the heat transfer surface and is a difference between a Maximum Allowable Heat Flux (MAHF) and an Actual Heat Flux (AHF) of the heat transfer surface.

3. The solar receiver as claimed in claim 1, wherein the heat transfer surface is configured based on parametric consideration of a solar field capability of the system, pressure drop of the system and thermal losses from the heat transfer surface.

4. The solar receiver as claimed in claim 1, wherein the plurality of tubes in the first panel comprises a different material than the plurality of tubes in the second panel.

5. The solar receiver as claimed in claim 1, wherein the plurality of tubes in the first panel comprises a different tube diameter than the plurality of tubes in the second panel.

6. A solar receiver, having a heat transfer medium, for a solar power system, the solar receiver comprising:
- a plurality of panels defining a heat transfer surface, each panel having a plurality of tubes arranged and configured to enable the heat transfer medium to flow in at least one flow direction, the at least one flow direction defining a pass to optimize heat flux capability of the various passes based on the location of the pass in the heat transfer surface in order to minimize a Lost Heat Flux Design Space (LHFDS) of the heat transfer surface,
- wherein the plurality of tubes in a first panel comprises a different material, tube thickness, and number of tubes than the plurality of tubes in a second panel to give the first panel a different mass flux than the second panel.

* * * * *